(12) United States Patent
Chethik et al.

(10) Patent No.: US 6,593,827 B2
(45) Date of Patent: Jul. 15, 2003

(54) MODULATING ARRAY TRANSMITTER AUTOCALIBRATION METHOD AND SYSTEM

(75) Inventors: Frank Chethik, Palo Alto, CA (US); Eric Fain, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/998,566

(22) Filed: Nov. 16, 2001

(65) Prior Publication Data

US 2003/0095012 A1 May 22, 2003

(51) Int. Cl.[7] ................................................. H03C 3/00
(52) U.S. Cl. ....................................... 332/103; 375/298
(58) Field of Search ................................. 332/103, 104, 332/105; 375/261, 298, 308; 330/107, 10, 124 R

(56) References Cited

U.S. PATENT DOCUMENTS

| | | | | |
|---|---|---|---|---|
| 4,464,767 A | * | 8/1984 | Bremer | 375/298 |
| 4,680,775 A | * | 7/1987 | Exarque et al. | 375/261 |
| 5,237,292 A | * | 8/1993 | Chethik | 332/103 |
| 5,381,449 A | * | 1/1995 | Jasper et al. | 375/298 |
| 5,463,355 A | * | 10/1995 | Halloran | 332/103 |
| 5,612,651 A | * | 3/1997 | Chethik | 332/103 |
| 6,421,398 B1 | * | 7/2002 | McVey | 375/308 |

* cited by examiner

Primary Examiner—Robert Pascal
Assistant Examiner—Joseph Chang
(74) Attorney, Agent, or Firm—Kenneth W. Float

(57) ABSTRACT

An autocalibrating modulating array transmitter 10 and autocalibration method 30. The autocalibrating modulating array transmitter is used to gain-balance and phase-balance parallel amplifier stages 11 for coherent combining. The novelty of the autocalibration technique involves periodic substitution of calibration symbols into a valid data stream, the use of only the error magnitude (as opposed to magnitude and phase), and a random selection of either gain or phase adjustments to avoid limit cycles.

2 Claims, 4 Drawing Sheets

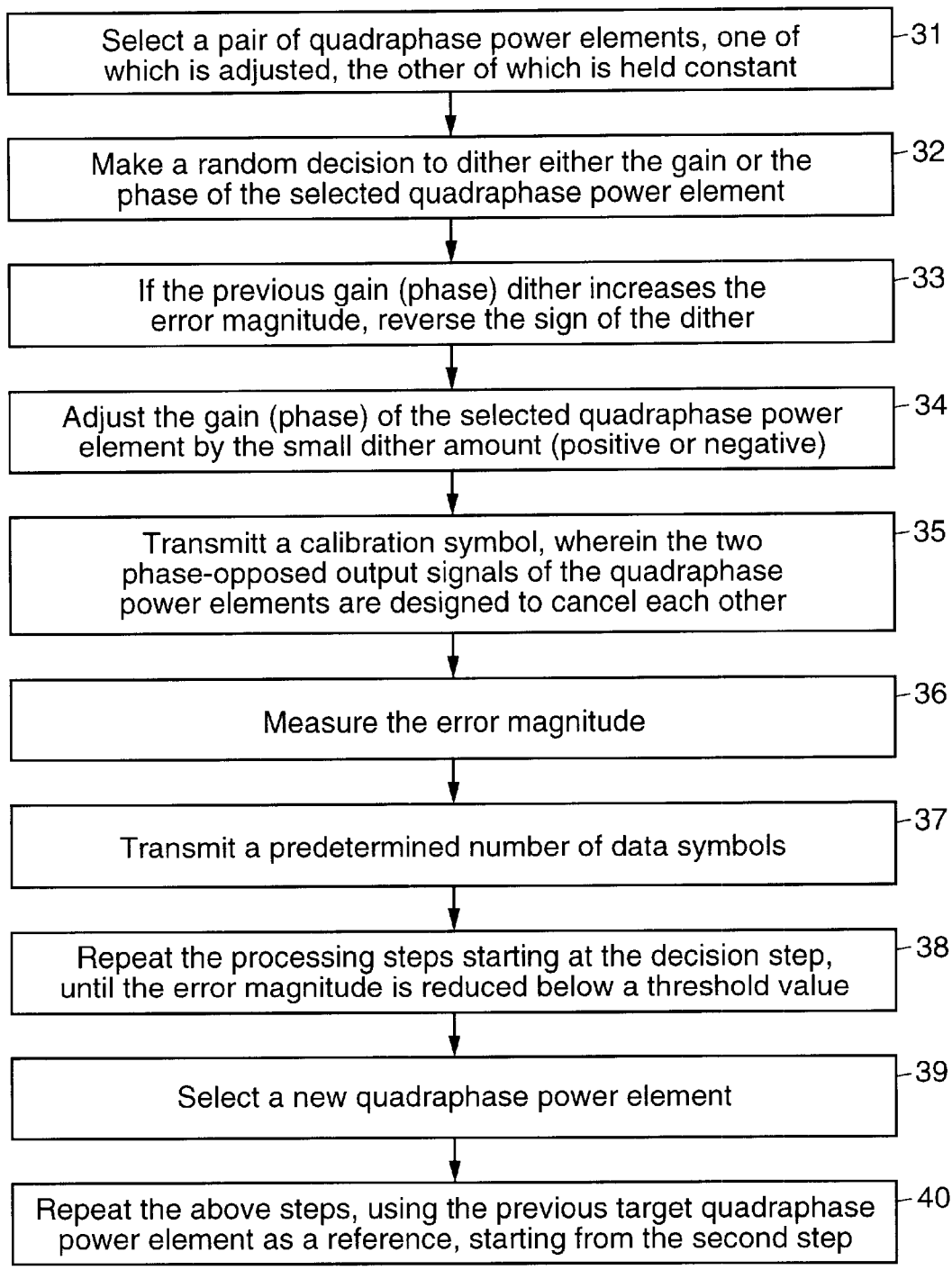

MODULATING ARRAY TRANSMITTER AUTOCALIBRATION METHOD AND SYSTEM

BACKGROUND

The present invention relates generally to modulating array transmitters, and more particularly, to an autocalibrating modulating array QAM transmitter system and method.

Heretofore, the assignee of the present invention has developed modulating array transmitters. For example, U.S. Pat. No. 5,612,651, assigned to the assignee of the present invention, discloses a "Modulating Array QAM Transmitter", and U.S. Pat. No. 5,381,449 issued to Jasper et al. disclose "Peak to Average Power Ratio Reduction Methodology for QAM Communications Systems", for example. However to date, there has not been any system or method that provides for autocalibration of such modulating array transmitters.

It is therefore an objective of the present invention to provide for autocalibrating modulating array QAM transmitter systems and methods.

SUMMARY OF THE INVENTION

To meet the above and other objectives, the present invention comprises autocalibrating modulating array QAM transmitter systems and methods. The present invention provides for self alignment of elements of a modulating array transmitter to maintain high waveform precision. The present invention is self correcting, requiring no manual alignment or realignment of transmitter elements, which is particularly important in satellite transmitters, for example. The present invention also maintains high precision of the communications waveform over the lifetime of the transmitter so that overall communications efficiency is maintained.

An exemplary autocalibrating modulating array transmitter system comprises a plurality of discrete, parallel quadrature power elements that each include a QPSK modulator coupled by way of a gain/phase adjustment circuit to a high-power amplifier driven to saturation. Data bits are input to a bit-to-symbol mapper whose outputs are coupled to the respective quadrature power elements. Outputs of the quadraphase power elements are combined in a passive network to produce a multilevel, high-power RF output signal. The output signal is sampled by a coupler and input to an autocalibration controller having outputs coupled to the bit-to-symbol mapper and to one of the gain/phase adjustment circuits. The autocalibration controller comprises a signle analog-to-digital converter that is used to sample the RF output signal.

An exemplary method or algorithm that is implemented in the autocalibrating modulating array transmitter system, and in particular in the autocalibration controller, comprises the following steps. A pair of quadraphase power elements is selected, one of which is adjusted, the other of which is held constant. A random decision is made to dither either the gain or the phase of the selected quadraphase power element. If the previous gain (phase) dither increases the error magnitude, the sign of the dither is reversed. The gain (phase) of the selected quadraphase power element is adjusted by the small dither amount (positive or negative).

A calibration symbol is sent, wherein the two phase-opposed output signals of the quadraphase power elements are designed to cancel each other. An analog-to-digital converter measures the error magnitude. Then, a predetermined number ($10^5$) of data symbols are sent, and the processing steps are repeated starting at the decision step, until the error magnitude is reduced below a threshold value. A new quadraphase power element is selected, and the above steps are then repeated, using the previously selected quadraphase power element as a reference, starting from the second step.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 is a flow diagram illustrating an exemplary modulating array transmitter autocalibration method implemented in accordance with the principles of the present invention.

DETAILED DESCRIPTION

Figure 1:
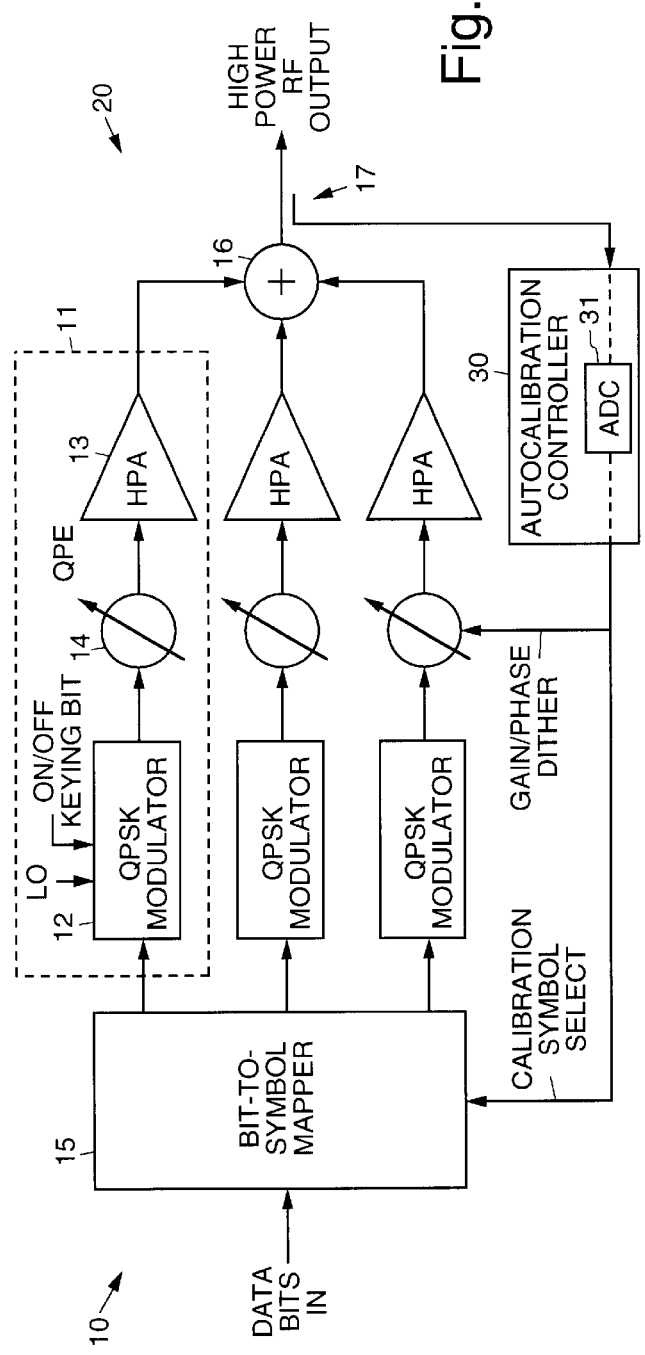
FIG. 1 is a block diagram of a three-stage modulating array transmitter autocalibration system implemented in accordance with the principles of the present invention.

Referring to the drawing figures, FIG. 1 is a block diagram of a three-stage modulating array transmitter 10 comprising an autocalibration system 20 implementing in accordance with the principles of the present invention. In general, the modulating array transmitter 10 has an architecture that provides for digital radio communications.

The modulating array transmitter autocalibration system 20 is used to gain-balance and phase-balance parallel amplifier stages 11 for coherent combining. The novelty of the autocalibration system 20 lies in the periodic substitution of calibration symbols into a valid data stream, the use of only the error magnitude (as opposed to magnitude and phase), and a random selection of either gain or phase adjustments to avoid limit cycles.

The basic design and operating principles of the modulating array transmitter 10 is described U.S. Pat. No. 5,612,651, assigned to the assignee of the present invention, the contents of which are incorporated herein by reference in their entirety. In general, the modulating array transmitter 10 converts digital data into a radio frequency signal for spectrum-efficient, over-the-air transmission.

In summary, the modulating array transmitter 10 is a high-power, direct-conversion QAM (quadrature amplitude modulation) modulator. The modulating array transmitter 10 is comprised of a plurality of discrete, parallel stages 11, referred to as quadrature power elements (QPE) 11. Each quadraphase power element 11 comprises a QPSK modulator 12 and a (solid-state) high-power amplifier 13 driven to saturation. The QPSK modulator 12 is coupled to the high-power amplifier 13 by way of a gain/phase adjustment circuit 14.

Data bits input to the modulating array transmitter 10 are supplied to a bit-to-symbol mapper 15 whose outputs are input to the plurality of quadrature power elements 11. Each quadrature power element 11 has an on/off keying input for receiving an on/off keying bit input signal that selectively keys the modulator on and off, and a local oscillator input (LO) for receiving a reference input signal.

The quadrature power element 11 modulates the reference input signal in accordance with the digital input signals and outputs a modulated RF excitation signal which is subsequently amplified by the high-power amplifier 13. Outputs of the quadraphase power elements 11 are combined in a passive network 16 or power combiner 16 to build a multilevel, high-power RF output signal.

The high-power RF output signal is sampled by a coupler 17 and input to an autocalibration controller 30 in accordance with the present invention. The autocalibration controller 30 has outputs that are coupled to the bit-to-symbol mapper 15 and to one of the gain/phase adjustment circuits 14. The autocalibration controller 30 comprises a single analog-to-digital converter (ADC) 31 that is used to sample the high-power RF output signal.

To form a desired high-order constellation of transmitted symbols, such as 64QAM, 128QAM, 256QAM, and so forth, the quadraphase power elements 11 must be in careful gain and phase alignment. Since these gains and phases may drift over the long-term life of the transmitter 10, adaptive correction is required.

Details of the autocalibration system 20 will now be described. The approach used in implementing the autocalibration system 20 relies on forward error-correction (FEC) in the communications link. Since most practical digital communications systems employ error-correction coding, this is not an onerous requirement. The concept of operation of the autocalibration system 20 is that once every $10^5$–$10^6$ symbols, a calibration symbol is substituted for a valid QAM data symbol. Since this substitution rate occurs well below the typical FEC threshold for error-correction, these symbols are automatically corrected at a receiver, and no data is lost. Each calibration symbol is ideally a zero signal, generated by the sum of two phase opposed outputs of a quadraphase power element 11. The actual symbol observed is therefore an error signal for the two selected quadraphase power elements 11.

The analog-to-digital converter (ADC) 31 of the autocalibration controller 30 is coupled to the high-power output of the modulating array transmitter 10 and samples the magnitude of the calibration symbol. Phase is not measured, because this would require a coherent receiver or quadrature down-converter to be incorporated in the transmitter 10. Since only the error magnitude is available, the output samples are used to alternately dither the gain and phase of one quadraphase power element 11 over subsequent calibration symbols until the error is driven to zero. This process is repeated for all quadraphase power elements 11 in a round-robin fashion. If a "hot" spare quadraphase power element 11 is included in the modulating array transmitter 10, this approach ensures that the hot spare quadraphase power element 11 is always ready to be switched-in.

Referring again to FIG. 1, it is a block diagram of a three-stage modulating array transmitter 10, capable of modulating 16QAM. The autocalibration system 20 comprises the autocalibration controller 30 that adjusts the gain and phase of the input to the high power amplifier 13, as well as the symbol mapping and scheduling of calibration symbols.

Figure 2:
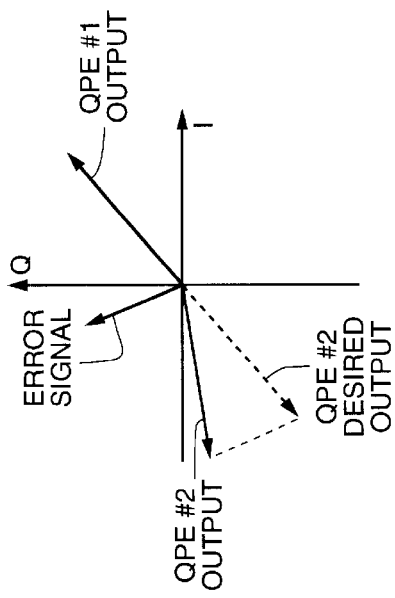
FIG. 2 illustrates an error signal representing one calibration symbol that is the vector sum of two-component quadraphase power element outputs.

The autocalibration system 20 employs a autocalibration algorithm 30 or method 30 that will now be described. FIG. 2 depicts how the calibration symbol generates an error in signal space. The autocalibration algorithm 30 or method 30 is straightforward, and is summarized below. The autocalibration algorithm 30 or method 30 is pictorially illustrated in the form of a flow diagram shown in FIG. 7.

A pair of quadraphase power elements 11 is selected 31, one of which is adjusted, the other of which is held constant. A random decision 32 is made to dither either the gain or the phase of the selected quadraphase power element 11. If the previous gain (phase) dither increases the error magnitude, the sign of the dither is reversed 33. The gain (phase of the selected quadraphase power element 11 is adjusted 34 by the small dither amount (positive or negative).

A calibration symbol is sent 35, wherein the two phase-opposed output signals of the quadraphase power elements 11 are designed to cancel each other. The analog-to-digital converter (ADC) 31 measures 36 the error magnitude. Then, $10^5$ data symbols are sent 37, and the processing steps are repeated 38 starting at the second step 32 (the decision step), until the error magnitude is reduced below a threshold value. A new quadraphase power element 11 is selected, and the above steps are then repeated 39, using the previously selected (target) quadraphase power element 11 as a reference, starting from the second step 32.

Essentially, each gain and phase adjustment is made as a one-dimensional steepest-descent algorithm. An exemplary one-dimensional steepest-descent algorithm is discussed in S. Haykin, "Adaptive Filter Theory," 3rd ed. Prentice-Hall, N.J. 1996, for example. The simple geometry of the problem (as is shown in FIG. 2) assures a single minimum for each parameter. The random selection of gain dither versus phase dither is used to prevent limit cycles in the convergence of the algorithm 30.

Figure 3:
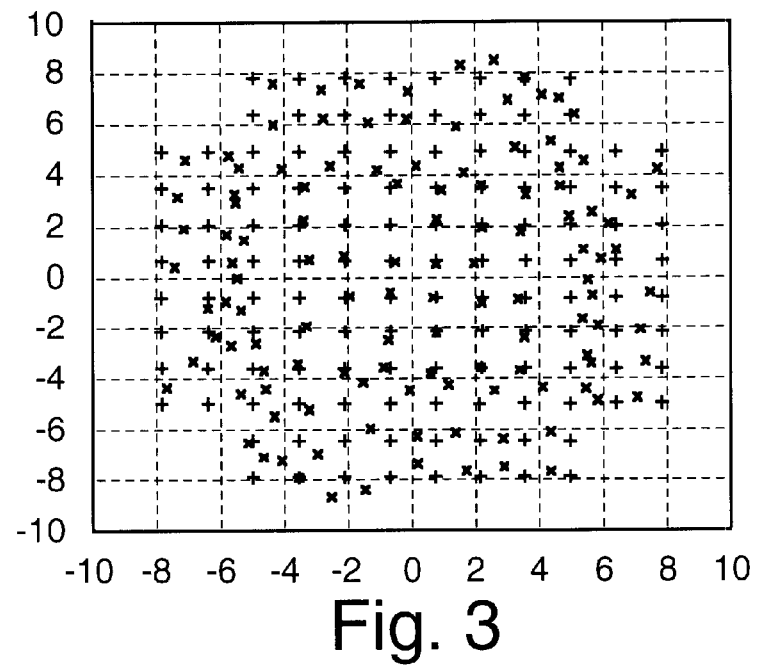
FIG. 3 illustrates an initial distorted 128QAM constellation, wherein "X"s are the transmitted points, and "+"s are the desired points, and wherein transmitter noise is not included.
Figure 4:
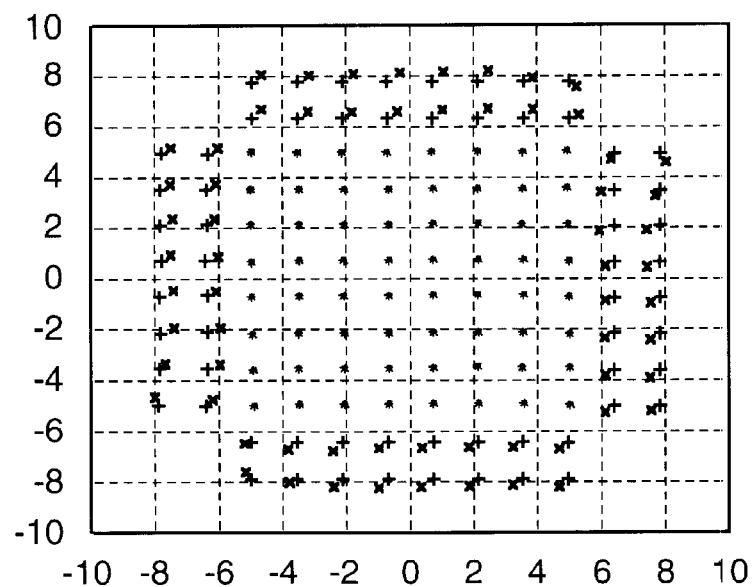
FIG. 4 illustrates a 128 QAM constellation after 50 iterations.
Figure 5:
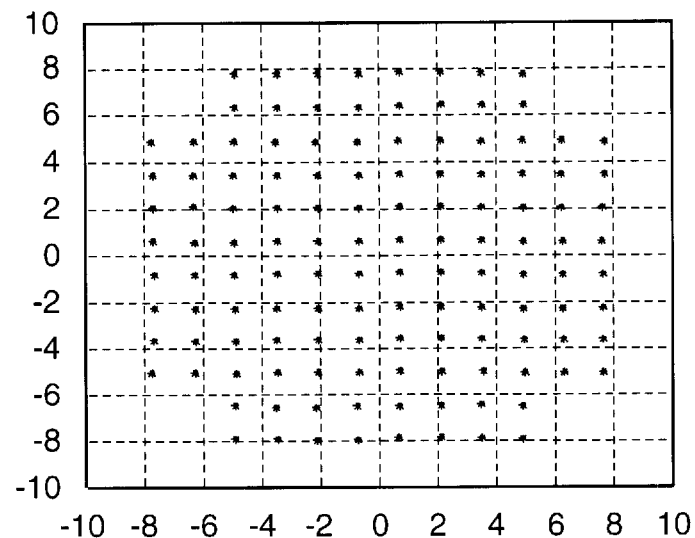
FIG. 5 illustrates a final converged constellation after 100 iterations, and 1100 quadraphase power element updates.

Simulation of the autocalibration procedure employed in the autocalibration system 20 has shown convergence to be relatively fast, with excellent results in less than 100 calibration symbols per quadraphase power element 11. Representative simulation results are shown in FIGS. 3–6. In this example, a 128QAM-generating modulating array transmitter 10 is considered, using eleven quadraphase power elements 11. FIG. 3 shows a randomly chose, initial distorted signal constellation due to gain and phase errors among the quadraphase power elements 11. After fifty iterations on each quadraphase power element 11, most of the distortion has been removed, as shown in FIG. 4. Only the most deviant quadraphase power elements 11 contribute to the error. After one-hundred iterations, the constellation in FIG. 5 is nearly ideal, and only very small errors remain.

Figure 6:
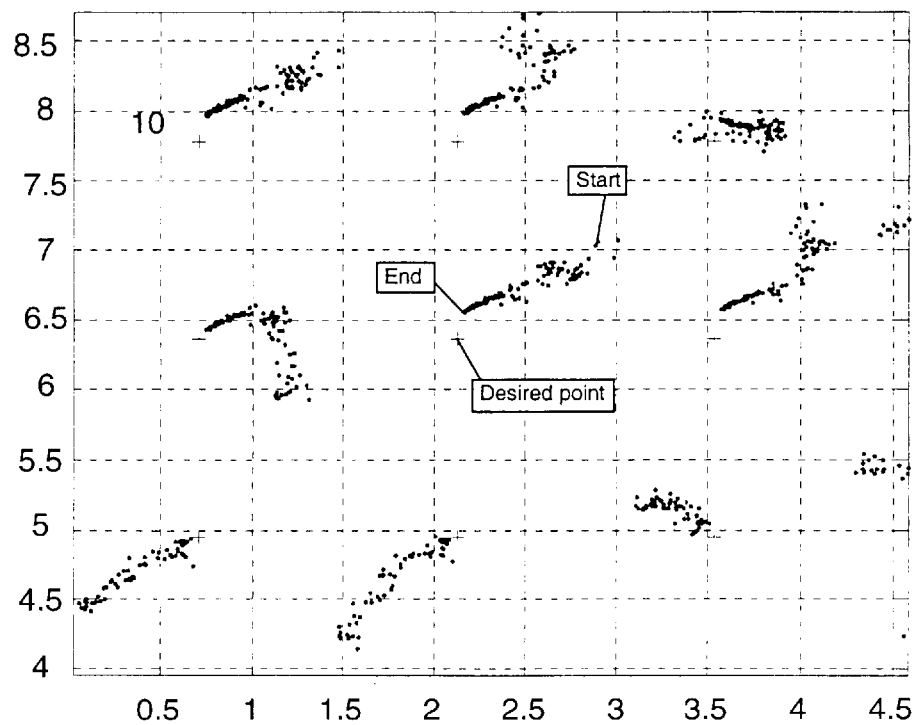
FIG. 6 illustrates constellation point trajectories as the autocalibration system converges.

Trajectories of the constellation points are shown in FIG. 6. A few points in the constellation are shown, where each dot represents one iteration of all eleven quadraphase power elements 11. The path to the desired point is not direct, since this depends on the combination of eleven different random errors. However, as the dots become more densely packed (and convergence slows) the smaller errors are removed, and the trajectory moves in the direction of the desired point.

Thus, autocalibrating modulating array transmitter systems and methods have been disclosed. It is to be understood that the described embodiments are merely illustrative of some of the many specific embodiments which represent applications of the principles of the present invention.

Clearly, numerous and other arrangements can be readily devised by those skilled in the art without departing from the scope of the invention.

What is claimed is:

1. An autocalibrating modulated array transmitter comprising:
   a plurality of quadraphase power elements that each comprise:
   (a) a QPSK modulator having data inputs for receiving digital input signals, an on/off keying input for receiving an on/off keying bit input signal that selectively keys the modulator on and off, and a local oscillator input for receiving a reference input signal, for modulating the reference input signal in accordance with the digital input signals to output a modulated RF excitation signal;
   (b) a gain/phase adjustment circuit coupled to the QPSK modulator; and
   (c) a power amplifier coupled to the gain/phase adjustment circuit for receiving the modulated RF excitation signal, for outputting an amplified quadrature amplitude modulated output signal, and wherein selected pairs of power amplifiers that are driven with opposing phases to form certain symbols are keyed off by means of the respective on/off keying bit input signal coupled to the respective QPSK modulator;
   a power combiner coupled to the plurality of quadraphase power elements for combining the amplified quadrature amplitude modulated output signals derived therefrom to output a quadrature amplitude modulated output constellation containing a plurality of symbols; and
   an autocalibration controller having outputs coupled to the bit-to-symbol mapper and to one of the gain/phase adjustment circuits and that comprises an analog-to-digital converter for sampling the quadrature amplitude modulated output constellation and generating a calibration symbol selection signal that is coupled to the bit-to-symbol mapper and a gain/phase dither signal that is coupled to the gain/phase adjustment circuit that randomly dithers either the gain or the phase of the selected quadraphase power element.

2. In a modulated array transmitter comprising (a) a plurality of quadraphase power elements that each comprise (1) a QPSK modulator having data inputs for receiving digital input signals, an on/off keying input for receiving an on/off keying bit input signal that selectively keys the modulator on and off, and a local oscillator input for receiving a reference input signal, for modulating the reference input signal in accordance with the digital input signals to output a modulated RF excitation signal. (2) a gain/phase adjustment circuit coupled to the QPSK modulator, and (3) a power amplifier coupled to the gain/phase adjustment circuit for receiving the modulated RF excitation signal, for outputting an amplified quadrature amplitude modulated output signal, and wherein selected pairs of power amplifiers that are driven with opposing phases to form certain symbols are keyed off by means of the respective on/off keying bit input signal coupled to the respective QPSK modulator, (b) a power combiner for combining the amplified quadrature amplitude modulated output signals derived from the plurality of quadraphase power elements to output a quadrature amplitude modulated output constellation containing a plurality of symbols, a method for autocalibrating the modulated array transmitter comprising the steps of:
   selecting a pair of quadraphase power elements, one of which is adjusted, the other of which is held constant;
   making a random decision to dither either the gain or the phase of the selected quadraphase power element;
   if the previous gain or phase dither increases the error magnitude, reversing the sign of the dither;
   adjusting the gain or phase of the selected quadraphase power element y the small dither amount;
   transmitting a calibration symbol, wherein the two phase-opposed output signals of the quadraphase power elements are designed to cancel each other;
   measuring the error magnitude;
   transmitting a predetermined number of data symbols;
   repeating the processing steps starting at the decision step, until the error magnitude is reduced below a threshold value;
   selecting a new quadraphase power element, and
   repeating the above steps, using the previously selected quadraphase power element as a reference, starting at the decision step.

* * * * *